United States Patent [19]

Moakler et al.

[11] 4,405,867
[45] Sep. 20, 1983

[54] SYSTEM FOR TRANSFERRING A LOAD BETWEEN TWO POWER SOURCES WITHOUT INTERRUPTION OF POWER TO THE LOAD

[75] Inventors: William A. Moakler, Basking Ridge; Ralph H. Ringstad, Whippany, both of N.J.

[73] Assignee: Automatic Switch Company, Florham Park, N.J.

[21] Appl. No.: 114,521

[22] Filed: Jan. 23, 1980

[51] Int. Cl.³ .............................................. H02J 3/42
[52] U.S. Cl. ......................................... 307/64; 307/87
[58] Field of Search .................... 307/51, 64, 65, 66, 307/67, 68, 85, 86, 87, 70

[56] References Cited

U.S. PATENT DOCUMENTS

| | | | |
|---|---|---|---|
| 2,968,705 | 1/1961 | Monbeck et al. | 307/64 X |
| 3,601,619 | 8/1971 | Ringstad | 307/87 |
| 4,090,090 | 5/1978 | Johnston | 307/87 |
| 4,189,649 | 2/1980 | Przywozny et al. | 307/64 |

Primary Examiner—G. Z. Rubinson
Assistant Examiner—James L. Dwyer
Attorney, Agent, or Firm—Alan H. Levine

[57] ABSTRACT

A system for transferring a load from a first to a second AC power source, including a monitor for sensing both power sources and producing an output signal when the differences in voltage, frequency, and phase between the two sources are within prescribed limits. Contacts close, in response to the monitor output signal, to connect the second power source to both the first power source and the load. Other contacts open, to disconnect the first power source from the second power source and load, but only after the second power source has been connected to the first power source and the load. The contact arrangement may include an automatic transfer switch and separate contacts in parallel with one or both sets of transfer switch contacts, or it may involve two independently operable contactors, or it may involve a four position switch.

15 Claims, 16 Drawing Figures

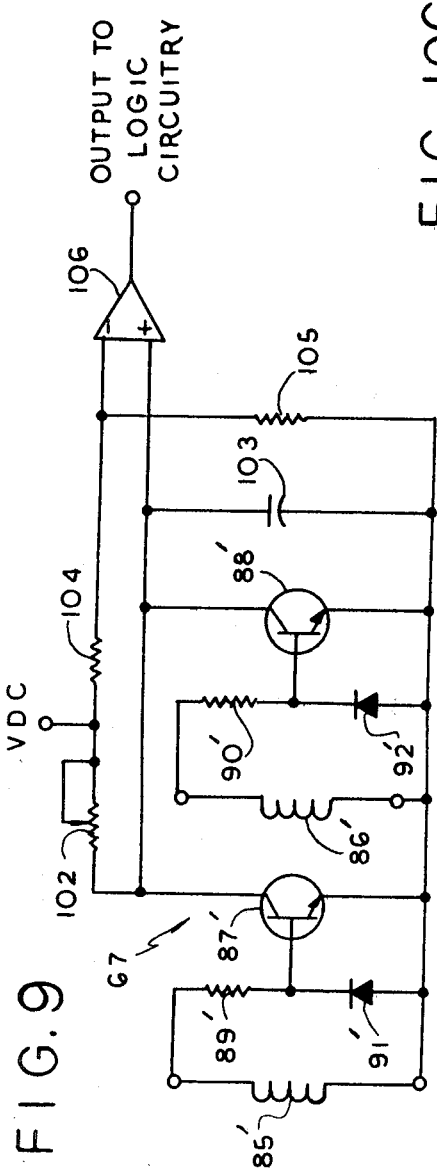
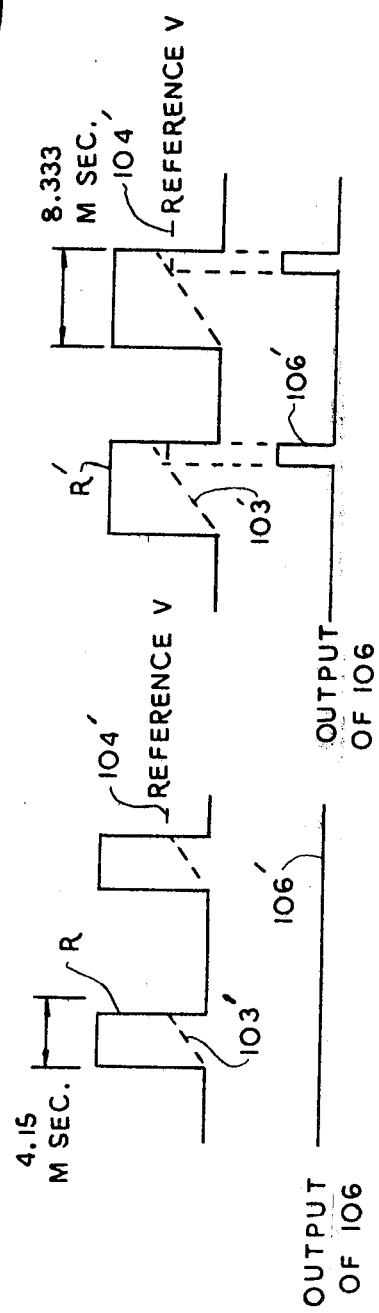

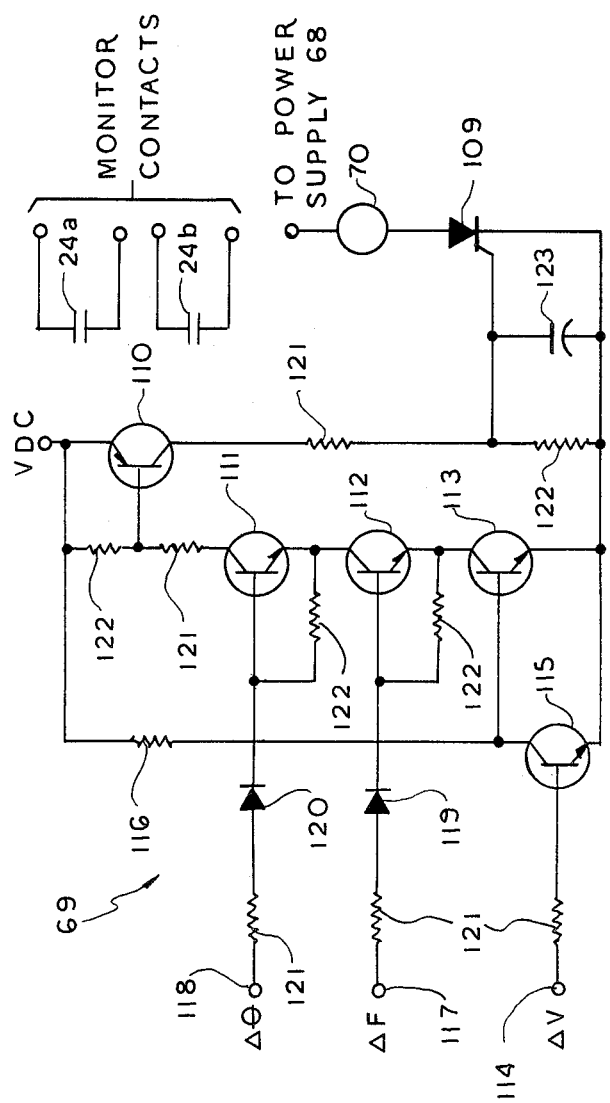
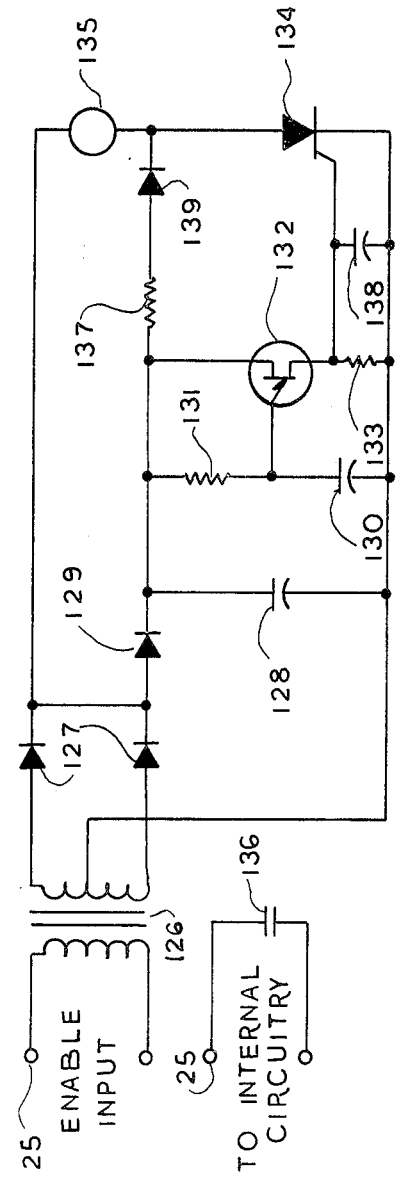
FIG. 11
FIG. 12

SYSTEM FOR TRANSFERRING A LOAD BETWEEN TWO POWER SOURCES WITHOUT INTERRUPTION OF POWER TO THE LOAD

This invention relates to the transfer of electrical loads from a normal power source, such as an electric utility, to an alternative or emergency power source, such as a local engine-generator set, upon the happening of some predetermined event, such as the failure or possible failure of the normal source, the load being transferred back to the normal source after the latter is restored or danger of its failure has passed.

For many years, systems including transfer switch arrangements have been employed which continuously monitor a normal power source, and upon that source becoming unacceptable for any reason, initiate the operation of an emergency power source and thereafter transfer the load from the normal source to the emergency source. These systems have been, and continue to be, successfully employed in a wide variety of installations. However, one characteristic of most of these systems making them unacceptable in certain situations is the fact that during each transfer operation, the load is momentarily disconnected from both power sources. In most circumstances, this momentarily interruption of power causes nothing more serious than a flickering of lights, and is of no great consequence.

As electronic equipment becomes more complicated and sensitive to power line disturbances, the small interruption of power that normally accompanies transfer from one power source to another represents a grave problem. For example, in computer centers where real time data is being continuously processed, a momentary power interruption can cause loss of data, false data, or both. Another illustration involves air traffic control. Even momentary interruption of power to equipment used by air traffic controllers often causes malfunction of the equipment and consequent danger to air traffic.

Systems have been devised to provide uninterrupted power to sensitive installations. One approach involves the use of large banks of batteries supplying DC equipment. In such a case, the batteries are connected across a battery charger energized by a normal power source. Upon failure of the normal source, the batteries supply all required power to the equipment for a sufficient time to permit the battery charger to be transfered to an emergency source. A drawback of this system is that commercial equipment designed to be run by the DC power of batteries is rare. Hence, systems are available incorporating an inverter to convert the DC output of the batteries to AC power. A problem with these systems is that they are very sophisticated and hence complicated and expensive.

It is, therefore, a general object of the present invention to provide a system for transferring an AC load between two power sources without interruption of power to the load and without being burdened by the high cost and complexity of the known system mentioned above incorporating batteries and an inverter.

It is another object of the invention to provide such a system wherein the emergency generator, after being started and brought up to speed, is momentarily paralleled with the operating utility source, after which the load is transferred to the emergency generator and the utility then disconnected from the load and emergency generator. In this way, the load is supplied with continuous power despite the transfer. Similar momentary paralleling of emergency generator and utility takes place when retransferring the load from the generator to the utility, thereby again avoiding any interruption of power to the load.

It is a further object of the invention to provide such a system wherein paralleling of the normal and emergency sources lasts only momentarily, e.g., 50 to 250 milliseconds, so as to preclude back feed from the emergency source to the utility should the utility fail, as well as other problems associated with long term parallel operation.

It is an additional object of the invention to provide such a system wherein a transfer accompanied by uninterrupted power to the load takes place only between two acceptable sources; where the source powering the load, e.g., the utility, fails suddenly and without warning, the system of this invention carries out a transfer to the emergency source which necessarily includes a brief interruption of power to the load. However, where continuity of power from the utility is questionable, before the utility source actually fails, e.g., in the case of an impending thunderstorm, hurricane, flood, or any other situation giving advance warning, the present invention provides for transfer with uninterrupted power to the load.

It is still another object of the invention to provide such a system wherein the contactors used to parallel the two sources, when used with a transfer switch arrangement, can be physically small and fast acting, since they do not carry continuous loads but instead are used only momentarily.

It is still a further object of the invention to provide such a system incorporating a monitor for sensing the relative voltage, relative frequency, and relative phase of the two sources, and permitting paralleling of the sources only when the voltages, frequencies, and phase relationship are within a prescribed range of minimum differences. It is important for the two sources to have a minimum phase difference, say +5 electrical degrees. Should the emergency generator be considerably out of phase with the utility at the time the sources are paralleled, the much "stiffer" utility will snap the generator into phase with it, causing a large inrush current. This can result in damage to the generator, its prime mover, and/or the mechanical coupling between them, as well as tripping of the circuit breakers with discontinued operation.

It is also important for the two sources to have a minimum voltage amplitude difference, say ±5% of the utility voltage. In the absence of a small difference in voltage, large amounts of reactive current will flow between the emergency generator and the utility at the time they are paralleled. Such a current does not contribute to supplying the load, and if too great can cause circuit breakers to trip. Additionally, it is important that the frequency of the two sources have some minimum difference, say ±0.5 Hz. Should a large frequency differential be present at the moment of paralleling, a large transient current will be created as the utility attempts to keep the generator in synchronism. Specifically, if the emergency generator is running too fast, it will attempt to supply power to the utility, and because of its smaller size the generator will overload. If the emergency generator is running too slowly, the utility will operate the generator as a motor to speed it up.

All of these undesirable phenomena are avoided, according to the invention, by employing the voltage, frequency, and phase monitor, mentioned above.

Additional objects, features, and advantages of the invention will be apparent from the following description in which reference is made to the accompanying drawings.

Figures 8A, 8B:
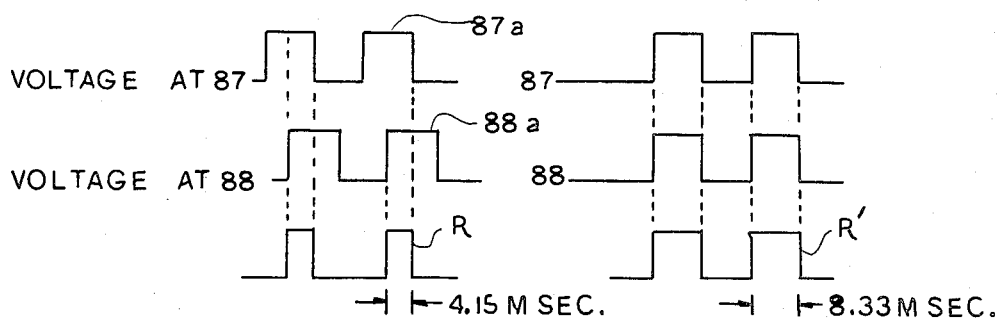
Figure 8C:
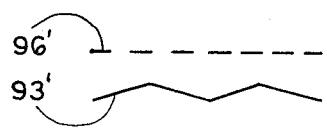

FIGS. 8a-c are explanatory diagrams relating to operation of the frequency difference detector;

FIG. 9 is a schematic diagram illustrating the phase difference detector portion of the monitor;

FIGS. 10a-c are explanatory diagrams relating to operation of the phase difference detector;

FIG. 11 is a schematic diagram illustrating the logic circuitry portion of the monitor; and FIG. 12 is a schematic diagram illustrating the time delay portion of the monitor.

Figure 1:
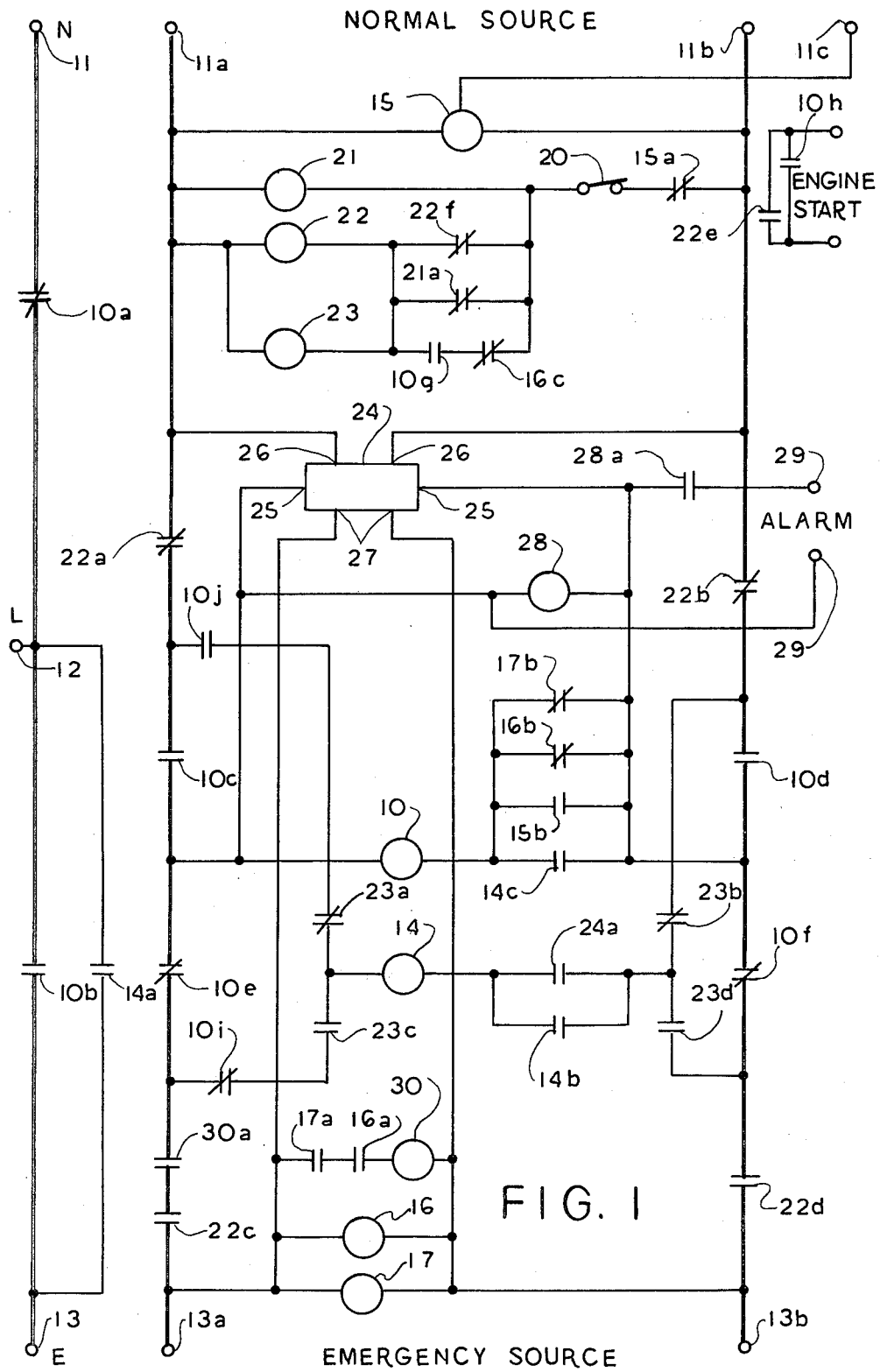
FIG. 1 is a schematic diagram showing one embodiment of a transfer system according to the present invention.
Figure 2:
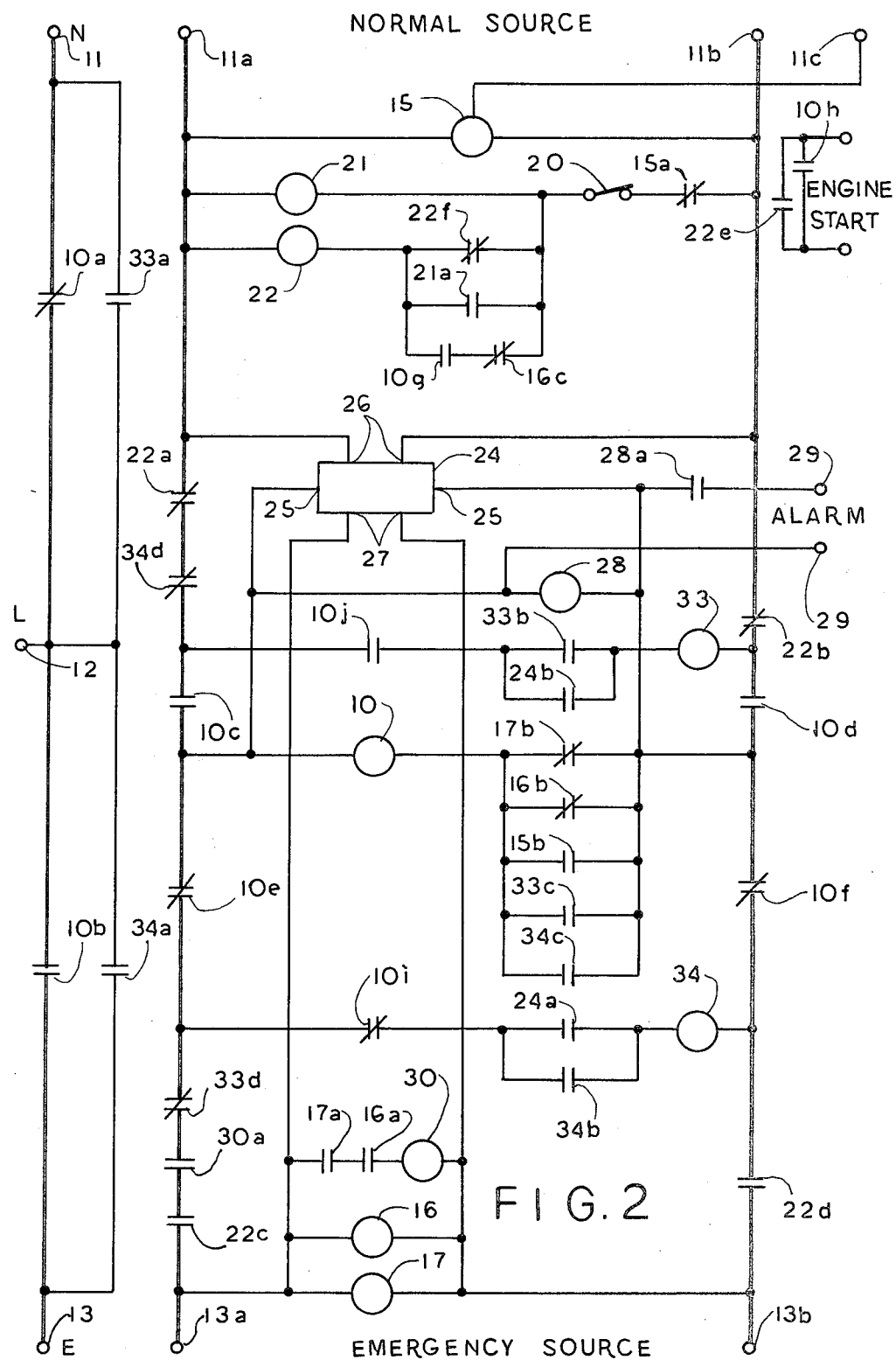
FIG. 2 is a schematic diagram showing a second embodiment of a transfer system according to the present invention.

The invention may be carried out in a number of ways, and four illustrative arrangements are described below with reference to FIGS. 1-4. In general, FIG. 1 shows a system utilizing a conventional automatic transfer switch and a contactor connected in parallel with the contacts on the emergency side of the transfer switch; FIG. 2 shows a system also utilizing a conventional automatic transfer switch and two contactors, one contactor being connected in parallel with the contacts on the normal side of the transfer switch and the other contactor being connected in parallel with contacts on the emergency side of the transfer switch; FIG. shows a system utilizing two large contactors and no automatic transfer switch; and FIG. 4 shows a four position switch arrangement.

For the sake of simplicity, the drawings show single phase arrangements, but it is to be understood that for three phase operation, the pairs of load switching contacts shown should be thought of as representing three pairs of load switching contacts, one for each phase. In this discussion, a pair of contacts is defined as a moving contact and a stationary contact.

The embodiment of FIG. 1 includes an automatic transfer switch having a pair of contacts 10a connected between the normal source terminal 11 and load terminal 12, a pair of contacts 10b connected between the emergency source terminal 13 and load terminal 12, and an actuating coil 10 shown as part of the control circuitry of the system. The transfer switch in this example is of the conventional single solenoid mechanically held, double throw type. A separate contactor includes a pair of contacts 14a, connected in parallel with transfer switch contacts 10b, controlled by a coil 14. In FIG. 1, the normal source, which may be an electric utility, is functioning and hence transfer switch contacts 10a are closed connecting the load to the normal source. The emergency source is off, and transfer switch contacts 10b and contactor contacts 14a are open, isolating the load from the emergency source.

Three terminals 11a, 11b, and 11c are connected to the three phases of the normal source, and two terminals 13a and 13b are connected to two of the three phases of the emergency source. An under voltage relay 15, including a three phase under voltage sensor, is connected to the three normal source terminals 11a-c. Another undervoltage relay 16, including a single phase under voltage sensor, and an under frequency relay 17, including an under frequency sensor, are connected in parallel to the two emergency source terminals 13a and 13b.

Relay 15 has two pairs of contacts 15a and 15b, contacts 15a being connected in series with a test switch 20 and a time delay relay coil 21, this relay including contacts 21a. Also connected between switch 20 and terminal 11a is a transfer relay coil 22 and an auxiliary relay coil 23. The transfer relay has six pairs of contacts 22a-f, and the auxiliary relay has four pairs of contacts 23a-d.

The arrangement includes an inphase monitor 24 having two enable inputs 25 connectable through various pairs of switch contacts to terminals 11a and 11b and to terminals 13a and 13b. Sampling inputs 26 of monitor 24 are connected to normal source terminals 11a and 11b, and sampling inputs 27 of the monitor are connected to emergency source terminals 13a and 13b. Monitor 24 controls a pair of contacts 24a. Connected across the enable inputs 25 of the monitor is another time delay relay coil 28 controlling a pair of contacts 28a, through which the enable inputs are connectable to the terminals 29 of an alarm.

In addition to the load current-carrying contacts 10a and 10b, the transfer switch also includes eight pairs of control circuit contacts 10c-10j. In addition to contacts 14a, contactor coil 14 also controls two pairs of contacts 14b and 14c. Relay 16 has three pairs of contacts 16a, 16b, and 16c, and relay 17 has two pairs of contacts 17a and 17b. Contacts 16a and 17a are connected in series with a potential relay coil 30 controlling a pair of contacts 30a.

Assume that the normal source is functioning adequately, the emergency source is off, and it is desired to transfer the load from the normal source to the emergency source without interruption of power to the load. The circuit will be in the condition shown in FIG. 1, those pairs of contacts which are closed having a diagonal line through them, and those which are open having no such line. Since the normal source voltage is acceptable, relay 15 is energized, closing contacts 15a. A circuit is thereby completed energizing relays 21, 22, and 23.

To initiate the transfer, switch 20 is opened. As a result, relay 22 is deenergized, causing contacts 22a and 22b to open, and contacts 22c, 22d, and 22e to close. Closing of contacts 22e causes the engine which drives the emergency generator to start. Opening switch 20 also deenergizes relay 23 causing contacts 23a and 23b to open, and contacts 23c and 23d to close; relay 21 is deenergized as well opening contacts 21a.

When the emergency generator approaches its operating speed, relays 16 and 17 are energized, relay 16 typically being energized when the generator produces 95% of its nominal voltage, and relay 17 typically being energized when the generator reaches a frequency of 59.5 Hz. Contacts 16a and 17a close, energizing relay 30, causing contacts 30a to close. The enable inputs 25 of inphase monitor 24 are now connected to the emergency source terminals 13a and 13b through contacts 22c, 30a, 10e, 10f, and 22d. After a suitable delay, e.g., 1.5 seconds, produced by a time delay circuit within monitor 24, the monitor begins sampling the voltage, frequency, and phase differences between the normal and emergency sources, by means of its sampling inputs 26 and 27.

When the normal and emergency voltages are within, say, ±5.0%, their frequencies are within, say 0.5 Hz., and the phases of the two sources come within, say, ±5.0 electrical degrees of each other, monitor 24 causes its contacts 24a to close. As a result, contactor coil 14 is energized through contacts 22c, 30a, 10i, 23c, 24a, 23d, and 22d, causing contacts 14a to close thereby connecting emergency source terminal 13 to both the load terminal 12 and the normal source terminal 11, i.e., paralleling the emergency and normal sources. When contacts 14a close, contacts 14b and 14c also close; contacts 14b are holding contacts for relay coil 14. Should the emergency source voltage temporarily dip when the load is applied to it, monitor contacts 24a may open, but relay coil 14 will remain energized through contacts 14b.

Closing of contacts 14c completes a circuit energizing transfer switch coil 10, through contacts 22c, 30a, 10e, 14c, 10f, and 22d, causing the contact arm of the transfer switch to pivot. When the transfer switch arm reaches approximately its midpoint of travel, contacts 10a open, disconnecting the load from the normal source. However, the load remains energized by the emergency source through contacts 14a. At the same time, contacts 10e and 10f open deenergizing both transfer switch coil 10 and monitor 24. Transfer switch coil 10 has thus been energized only momentarily, and the transfer switch arm completes its travel to the emergency side by inertia. Transfer switch contacts 10b close, after which the transfer switch contact arm moves slightly further, to insure good contact between contacts 10b, at which point contacts 10i open, thereby deenerizing contactor coil 14. Contacts 14a open, but the load is not disturbed since it continues to be supplied from the emergency source through contacts 10b. Contacts 10c, 10d, and 10j have not also been closed.

When the danger, or potential danger, to the normal source passes, the load is transferred back to the normal source, without interruption of supply to the load, by essentially reversing the operation described above. Test switch 20 is closed energizing time delay relay 21. Relay 21 provides a delay to insure that the normal source is constant. Should the normal source voltage drop before relay 21 times out, undervoltage relay 15 will cause contacts 15a to open thereby resetting relay 21. When relay 21 times out, contacts 21a close energizing relays 22 and 23. Contacts 22f close to provide a holding circuit for these relays. Contacts 22c, d, and e open and contacts 22a and b close. At the same time, contacts 23c and d open and contacts 23a and b close.

The enable inputs 25 of inphase monitor 24 are now connected to normal source terminals 11a and 11b through contacts 22a, 10c, 10d, and 22b, and after a 1.5 second delay, monitor 24 begins to sample the voltage, frequency, and phase relationship between the normal and emergency sources. When the sources meet the requirements mentioned above, the monitor contacts 24a close energizing contactor coil 14 through contacts 22a, 10j, 23a, 24a, 23b, and 22b. Contactor contacts 14a close connecting load terminal 12 to emergency source terminal 13 in parallel with transfer switch contacts 10b. Holding contacts 14b for coil 14 also close, and contacts 14c close energizing the transfer switch coil 10. The transfer switch arm pivots, and half way through its travel contacts 10c and d open deenergizing both transfer switch coil 10 and monitor 24. At the same time, transfer switch contacts 10b open, but the load remains connected to the emergency source through contacts 14a.

As the transfer switch arm completes its travel, contacts 10a close, connecting the normal source to both the load and the emergency source, i.e., paralleling the normal and emergency sources. During a small further movement of the transfer switch arm, insuring good contact between contacts 10a, contacts 10j open deenergizing contactor coil 14. As a result, contacts 14a open, and the load is supplied solely by the normal source. Note that there has been no interruption of power to the load during this transfer. Contacts 10h are also opened at this point. These contacts had been closed to keep the emergency generator running even after contacts 22e opened upon reenergization of relay coil 22. Now, however, the generator is shut down, since it is no longer needed.

The circuit of FIG. 1 is also designed to provide a conventional type of transfer, in which the load experiences a brief interruption of power, in the event that the source to which the load is connected fails, and the other source is not immediately available. For example, suppose the load is connected to the normal source through transfer switch contacts 10a, and the normal source fails. Undervoltage relay 15 will cause its contacts 15a to open, whereby relays 22 and 23 become deenergized, and the emergency generator starts. At the same time, contacts 15b close. When the emergency generator comes up to speed, relays 16 and 17 are energized causing contacts 16a and 17a to close, thereby energizing relay 30 causing contacts 30a to close. Consequently, transfer switch coil 10 is energized through contacts 22c, 30a, 10e, 15b, 10f, and 22d. The transfer switch operates, opening contacts 10a and then closing contacts 10b to connect the load to the emergency source. Conversely, if the load is connected to the emergency source and that source fails, and assuming the normal source is available, undervoltage relay 16 and/or underfrequency relay 17 will cause contacts 16b and/or 17b to close. At the same time, contacts 16c will close, and since contacts 10g are closed, because the transfer switch is closed on the emergency side, relay 22 is energized. As a result, contacts 22a and b close energizing transfer switch coil 10 through contacts 22a, 10c, 16b, or 17b, 10d, and 22b. The transfer switch operates opening contacts 10b and then closing contacts 10a to connect the load to the normal source.

Time delay relay 28 is used to energize the alarm connected to terminals 29 in the event that inphase monitor 24 does not operate to close contacts 24a after a duration determined by relay 28. If for some reason the voltage or frequency differential between the sources is excessive, monitor 24 will not actuate its contacts. After a period of time, relay 28 closes contacts 28a energizing the alarm. However, activating the alarm does not prevent monitor 24 from continuing to operate in case a transfer can occur even after the alarm is energized.

In FIG. 1 one contactor 14, 14a is employed. In FIG. 2, two contactors are employed. One contactor includes contacts 33a connected in parallel with transfer switch contacts 10a and controlled by coil 33, and the second contactor includes contacts 34a connected in parallel with transfer switch contacts 10b and controlled by coil 34. Relay 23 of FIG. 1 is not present in FIG. 2. Contactor 33 includes three additional pairs of contacts 33b, c, and d, and contactor 34 includes three additional pairs of contacts 34b, c, and d. In all other respects, the arrangement of FIG. 2 is similar to that of FIG. 1.

With the normal source functioning adequately and the emergency source off, opening test switch 20 causes relay 22 to be deenergized, opening contacts 22a, 22b, and 22f, and closing contacts 22c, 22d, and 22e. Closing of the latter pair of contacts starts the engine driving the emergency generator. As the generator approaches its operating speed, relay 16 is energized closing contacts 16a and opening contacts 16b, and relay 17 is energized closing contacts 17a and opening contacts 17b. Relay 30 is thereby energized, closing contacts 30a, with the result that inputs 25 of inphase monitor 24 are energized through contacts 22c, 30a, 33d, 10e, 10f, and 22d. After a short delay, monitor 24 starts to sample voltage, frequency, and phase difference of the two sources, and when appropriate it closes contacts 24a and b. Although contacts 24b close, contactor coil 33 is not energized since contacts 10j are open. However, contactor coil 34 is energized through contacts 22c, 30a, 33d, 10i, 24a, and 22d. Contacts 34b close to maintain coil 34 energized even should contacts 24a open momentarily after the transfer switch operates and the load is applied exclusively to the emergency source. Contacts 34a also close to connect the emergency source to the load and the normal source, i.e., parallel the emergency and normal sources.

After contactor contacts 34a close, contacts 34c close energizing transfer switch coil 10 through contacts 22c, 30a, 33d, 10e, 34c, 10f, and 22d. Consequently, transfer switch contacts 10a open, disconnecting the normal source from the load and emergency source, but no interruption of power to the load occurs, since it is already connected to the emergency source through contacts 34a. As the transfer switch arm completes its pivotal movement, contacts 10b close, and during the small further movement of the transfer switch arm, contacts 10i open deenergizing contactor coil 34. Contacts 34a open, but no interruption of power to the load occurs since transfer switch contacts 10b are closed. The load is now supplied solely by the emergency source.

To transfer the load back to the normal source, test switch 20 is closed. Relay 15 has closed contacts 15a, if the normal source is adequate, and relay 21 is energized to close contacts 21a, thereby energizing relay 22. Contacts 22c, d, and e open (but the engine continues running since contacts 10h are closed), and contacts 22a and b close. Enable input 25 of monitor 24 is energized through contacts 22a, 34d, 10c, 10d, and 22b, and after a delay starts sampling both sources. When conditions are correct, as described above, monitor contacts 24a and b close. Contactor coil 34 is not energized because contacts 10i are open. However, contactor coil 33 is energized through contacts 22a, 34d, 10j, 24b, and 22b. Contacts 33b close to keep coil 33 energized. Contacts 33a close connecting the normal source to the load and the emergency source. In addition, contacts 33c close energizing transfer switch coil 10 through contacts 22a, 34d, 10c, 33c, 10d, and 22b. Transfer switch contacts 10b open disconnecting the emergency generator from the load and the normal source. The load remains energized by the normal source through contactor contacts 33a. As the transfer switch arm pivots through the midpoint of its travel, contacts 10c and 10d open, deenergizing transfer switch coil 10 and monitor 24. After transfer switch contacts 10a close, contacts 10j open to deenergize contactor coil 33, resulting in contacts 33a opening. Also, contacts 10h open to shut down the engine/generator set. Should a source fail while the load is connected to it, a conventional transfer of the load to the other source takes place, as described with reference to FIG. 1.

Contactor contacts 33d and 34d represent an important safety precaution in the event contacts 33a or contacts 34a become welded together. Contacts 33d and 34d are normally closed, and open only when their respective coils 33 and 34 are energized to close contacts 33a or 34a. Should either pair of contacts 33a or 34a become welded together, their respective contacts 33d or 34d will remain open. Suppose contacts 34a become welded closed, contacts 34d will remain open. If transfer switch contacts 10b are closed, and a transfer back to the normal source is called for, the transfer switch will not operate, since with contacts 34d open, neither coil 33 nor transfer switch coil 10 can be energized. Relay 28 will then time out, activating the alarm. Without the provision of contacts 33d and 34d, the transfer switch would swing back to the normal side, connecting the normal source to the load and to the emergency source. Since contacts 34a cannot open, being welded, the normal source would continue to energize a non-operating generator. Conversely, if contacts 33a are welded, the presence of contacts 33d and 34d prevents the transfer switch from swinging to the emergency side so that the emergency source cannot be connected to a dead normal source.

Figure 3:
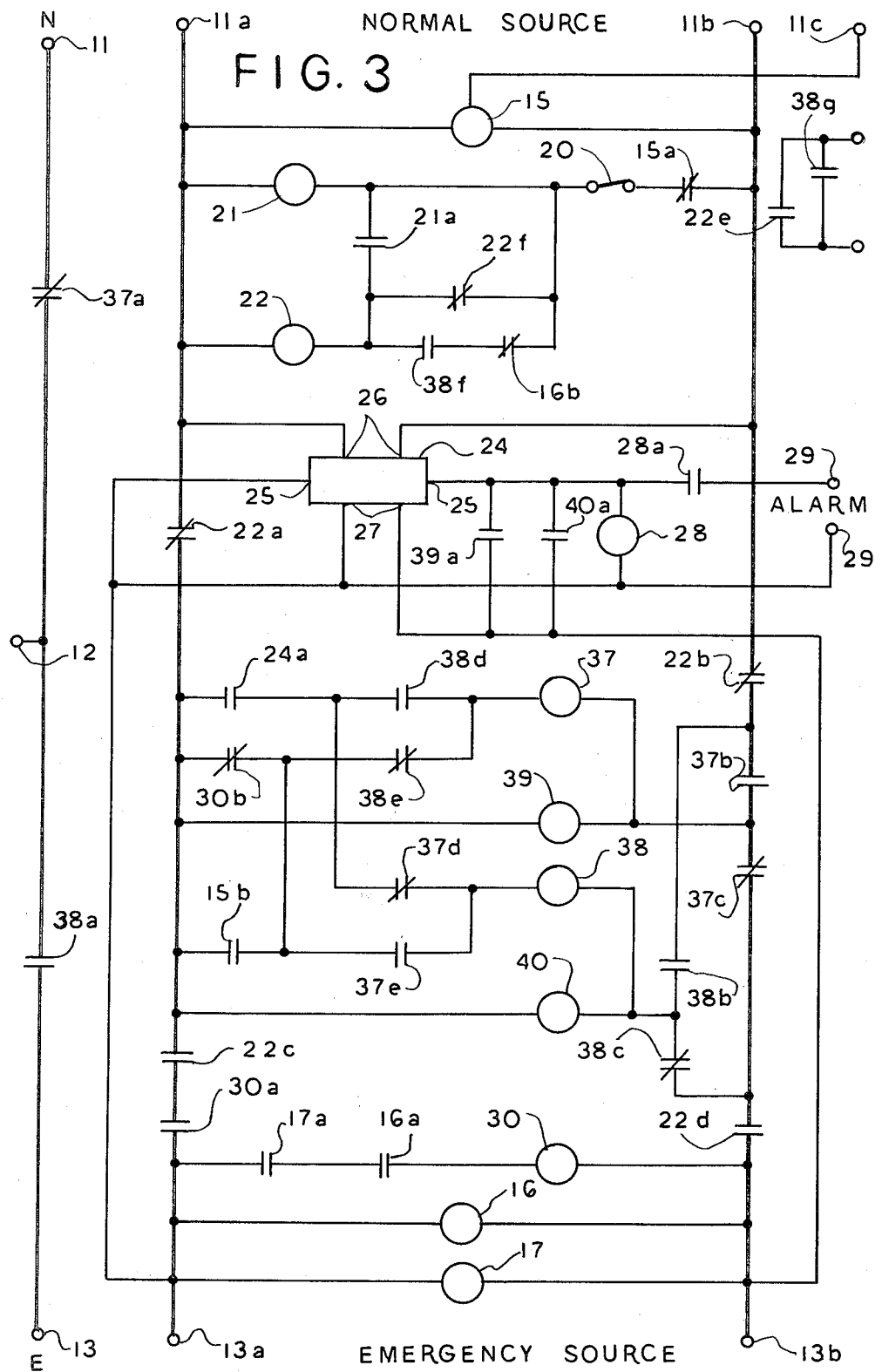
FIG. 3 is a schematic diagram showing a third embodiment of a transfer system according to the present invention.
Figure 4:
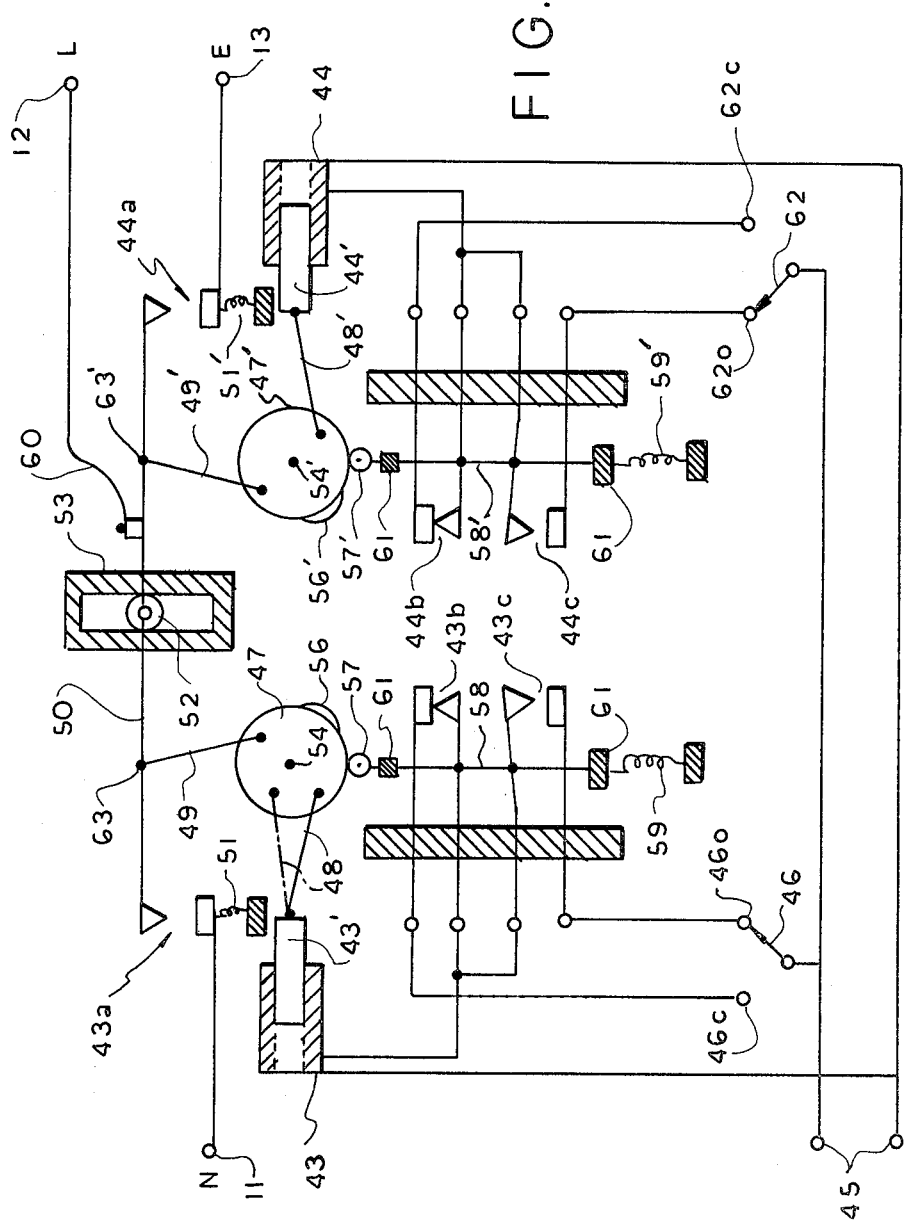
FIG. 4 is a schematic diagram showing a fourth embodiment of a transfer system according to the present invention.

In the embodiment of FIG. 3, no automatic transfer switch 10, 10a, 10b is employed. Instead, two single throw load-interrupting contactors are employed, each having an open and a closed position. One contactor includes an activating coil 37 and contacts 37a for connecting and disconnecting the load terminal 12 and normal source terminal 11, and the other contactor includes an activating coil 38 and contacts 38a for connecting and disconnecting the load terminal 12 and emergency source terminal 13. The two contactors are electrically interlocked so that under certain conditions the open one must close before the closed one opens.

Sensing of voltage, frequency, and phase of the two sources is the same as described above. Assume contacts 37a are closed, contacts 38a are open, the normal source is functioning, and a transfer of the load to the emergency source is desired. Test switch 20 is opened deenergizing relay 22, and causing contacts 22a and b to open and contacts 22c, d, and e to close. The engine starts, driving the emergency generator, relays 16 and 17 are ultimately energized, and contacts 16a and 17a close to energize relay 30 and close contacts 30a. Consequently, relay 39 is energized, through contacts 30a, 22c, 37c, and 22d, and relay 40 is also energized, through contacts 30a, 22c, 38c, and 22d. Contacts 39a and 40a close, and monitor enable input 25 is energized through these contacts. When monitor contact 24a closes, contactor coil 38 is energized through contacts 30a, 22c, 24a, 37d, 38c, and 22d. Contacts 38a close, connecting the emergency source to both the load and the normal source. After contacts 38*a* close, contacts 38*c* and *e* open and contacts 38*b* and *d* close. Opening of contacts 38*c* deenergizes contactor coil 38 and closing of contacts 38*d* energizes contactor coil 37 through contacts 30*a*, 22*c*, 24*a*, 38*d*, 37*c*, and 22*d*. Contacts 37*a* open disconnecting the normal source from the load and the emergency source. However, the load receives uninterrupted power from the emergency source since contacts 38*a* are closed. Contacts 37*c* and 37*d* open and contacts 37*b* and 37*e* close. The load is now connected solely to the emergency source.

To transfer the load back to the normal source, test switch 20 is closed, and the operation described above is reversed.

The circuit of FIG. 3 will provide a conventional type of transfer, in which the load experiences an interruption of power, in the event that the source to which the load is connected fails, and the other source is not immediately available. For example, should the normal source fail while connected to the load, and with the emergency generator off, relay 15 is deenergized opening contacts 15*a* and deenergizing relays 21 and 22. Contacts 22*a* and *b* open, and contacts 22*c*, *d*, and *e* close, the latter causing the engine to start and drive the generator. When the generator is up to speed, relays 16 and 17 are energized closing contacts 16*a* and 17*a* and energizing relay 30. Contacts 30*a* close energizing contactor coil 37 through contacts 30*a*, 22*c*, 15*b*, 38*e*, 37*c*, and 22*d*. As a result, contacts 37*a* open disconnecting the load from the failed normal source. In addition, contacts 37*d* open and contacts 37*e* close, causing energization of contactor coil 38 through contacts 30*a*, 22*c*, 15*b*, 37*e*, 38*c*, and 22*d*. As a result, contacts 38*a* close connecting the load to the emergency source.

Should the emergency source fail while the load is connected to it and before the normal source is reestablished, the load will, of course, be without power. However, when the normal source returns, the load will automatically be transferred to it. The reason is that relay 22 becomes energized, causing contacts 22*a* and *b* to close. As a result, contactor coil 38 is energized through contacts 22*a*, 30*b*, 37*e* (closed since contactor contacts 37*a*, are open), 38*b* (closed since contactor contacts 38*a* are closed), and 22*b*, thereby opening contacts 38*a* and disconnecting the load from the nonfunctioning emergency source. Contactor coil 37 will then be energized through contacts 22*a*, 30*b*, 38*e* (now closed since contacts 38*a* have been opened), 37*b* (closed since contacts 37*a* are open) and 22*b*, causing contacts 37*a* to close and connect the load to the normal source. It should also be noted that should the previously-failed normal source become adequate again while the load is connected to the functioning emergency source, the load will automatically be transferred back to the normal source, without interruption of power to the load, as soon as the time delay provided by relay 21 expires.

FIG. 4 illustrates a four-position switch which can optionally be used either to provide a conventional transfer, whereby the load is first disconnected from one source before being connected to an alternative source, or to provide a transfer according to the present invention, whereby both sources are paralleled before transfer of the load so that there is no interruption of power to the load.

The arrangement of FIG. 4 includes a terminal 11 connected to the normal source, a terminal 12 connected to the load, and a terminal 13 connected to the emergency source. Normal side switch contacts 43*a* connect and disconnect the load and normal source, and emergency side switch contacts 44*a* connect and disconnect the load and emergency source.

The movable contacts of switches 43*a* and 44*a* are carried at the ends of an arm 50, the stationary contacts of these switches being supported by springs 51 and 51′ to permit a small amount of continued movement after the movable contact engages the stationary contact. At its center, arm 50 carries a roller 52 movable vertically within a clevis 53, the roller and clevis preventing longitudinal movement of arm 50, but permitting pivotal movement. At least a portion 60 of the connection between arm 50 and terminal 12 is flexible so as not to interfere with pivotal movement of the arm. On each side of clevis 53, a link 49, 49′ pivotally connects arm 50 to an eccentric point on a generally cylindrical weight 47, 47′, the weight being rotatable about a central pivot axis 54, 54′. Another link 48, 48′ pivotally connects an eccentric point on the weight to an armature 43′ 44′ movable horizontally within a solenoid coil 43, 44.

A cam 56, 56′ on weight 47, 47′ can engage a follower 57, 57′ to move a rod 58, 58′ downwardly, within guides 61, so as to control contacts 43*b*, 44*b* and 43*c*, 44*c*, a spring 59, 59′ returning the rod upwardly when the cam leaves the follower. Two switches 46 and 62 control energization of solenoids 43 and 44, respectively, from a control power source connected to terminals 45.

In the drawing, both pairs of contacts 43*a*, and 44*a* are open so that the load is without power. To connect the load terminal 12 to normal source terminal 11, switch 46 is shifted from terminal 46*o* to terminal 46*c*. A circuit is completed to energize coil 43 through switch 46 and contacts 43*b*. As a result, armature 43′ moves toward the left pivoting weight 47 clockwise through link 48. Movement of the weight pulls link 49 downwardly thereby pulling arm 50 counterclockwise about pivot connection 63′ between link 49′ and arm 50. Hence, the movable contact of switch 43*a* moves downwardly to close switch 43*a* and connect the load to the normal source. At the same time, cam 56 on weight 47 engages follower 57 and drives rod 58 downwardly to open contacts 43*b* and close contacts 43*c*. Opening of the former contacts deenergizes coil 43. Weight 47 is now in a new stationary position and link 48 is in the position shown in broken lines.

To carry out a conventional transfer of the load to the emergency source, switch 46 is swung back to the position shown in the drawing, in contact with terminal 46*o*. Solenoid 43 is energized through switch 46 and closed contacts 43*c*, again pulling armature 43′ to the left. This causes counterclockwise pivotal movement of weight 47 and returns link 49 and arm 50 to the position shown in the drawing. Contacts 43*a* open and disconnect the load from the normal source. Switch 62 is now shifted from terminal 62*o* to terminal 62*c* causing energization of solenoid 44 through switch 62 and contacts 44*b*. Armature 44′ moves to the right pivoting weight 47′ counterclockwise through link 48′. The weight in turn pulls link 49 down, and arm 50 is pivoted about point 63, connecting link 49 and rod 50, to close contacts 44*a* and connect the load to the emergency source. Cam 56′ engages follower 57′ and drives rod 58′ downwardly to open contacts 44*b* and close contacts 44*c*. Opening contacts 44*b* deenergizes solenoid 44. Weight 47′ is now in a new position and remains there until switch 62 is operated again.

A transfer of the load from one source to the other, without interruption of power to the load can also be accomplished with the arrangement of FIG. 4. For example, if the load is connected to the emergency source, i.e., contacts 44a are closed and switch 62 is on terminal 62c, switch 46 is shifted to terminal 46c causing contacts 43a to close, as described above. The normal source is now connected to the load and the emergency source. Upon closure of contacts 43a, switch 62 is moved from terminal 62c to terminal 62o, thereby causing contacts 44a to open. The load is now connected only to the normal source, and the load was never without power throughout the transition from one source to the other.

Switches 46 and 62 are shown in FIG. 4 only for the purpose of illustration. In practice, the control circuitry for the arrangement of FIG. 4 is identical to that shown in FIG. 3, with solenoids 43 and 44 taking the place of coils 37 and 38 of FIG. 3. Additional auxiliary pairs of contacts will be required but they can be cam operated in the manner of contacts 43b and c and 44b and c.

Each of the embodiments of FIGS. 1–4 has its own advantages. For example, the arrangement of FIG. 1 employs a conventional automatic transfer switch, which can be retrofitted with the additional contactor 14, and only one small contactor is needed for addition to the transfer switch. Hence, this scheme is inexpensive. The arrangement of FIG. 2 also employs a conventional automatic transfer switch, which can be retrofitted with the two small additional contactors 33 and 34. In addition, neither of the small contactors is ever called upon to break current; hence, they draw no arc and will have a long life. Also, because of the momentary operation of contactor 14a (FIG. 1) and contactors 33a and 34a (FIG. 2), the continuous duty current rating of these contactors may be substantially less than the automatic transfer switch current rating. The FIG. 3 embodiment employs two large contactors, and hence there is no problem with current inrush or current interruption. Furthermore, this arrangement has an off position where both contactors are open, permitting complete isolation of the load, and also has a position where both contactors are closed, permitting continuous paralleling of the sources if desired. The arrangement of FIG. 4 has all the advantages of the FIG. 3 embodiment, and in addition is smaller in size and less expensive, since it employs a single switch arm 50, as opposed to two separate large contactors, and can be mounted on a single base.

Figure 5:
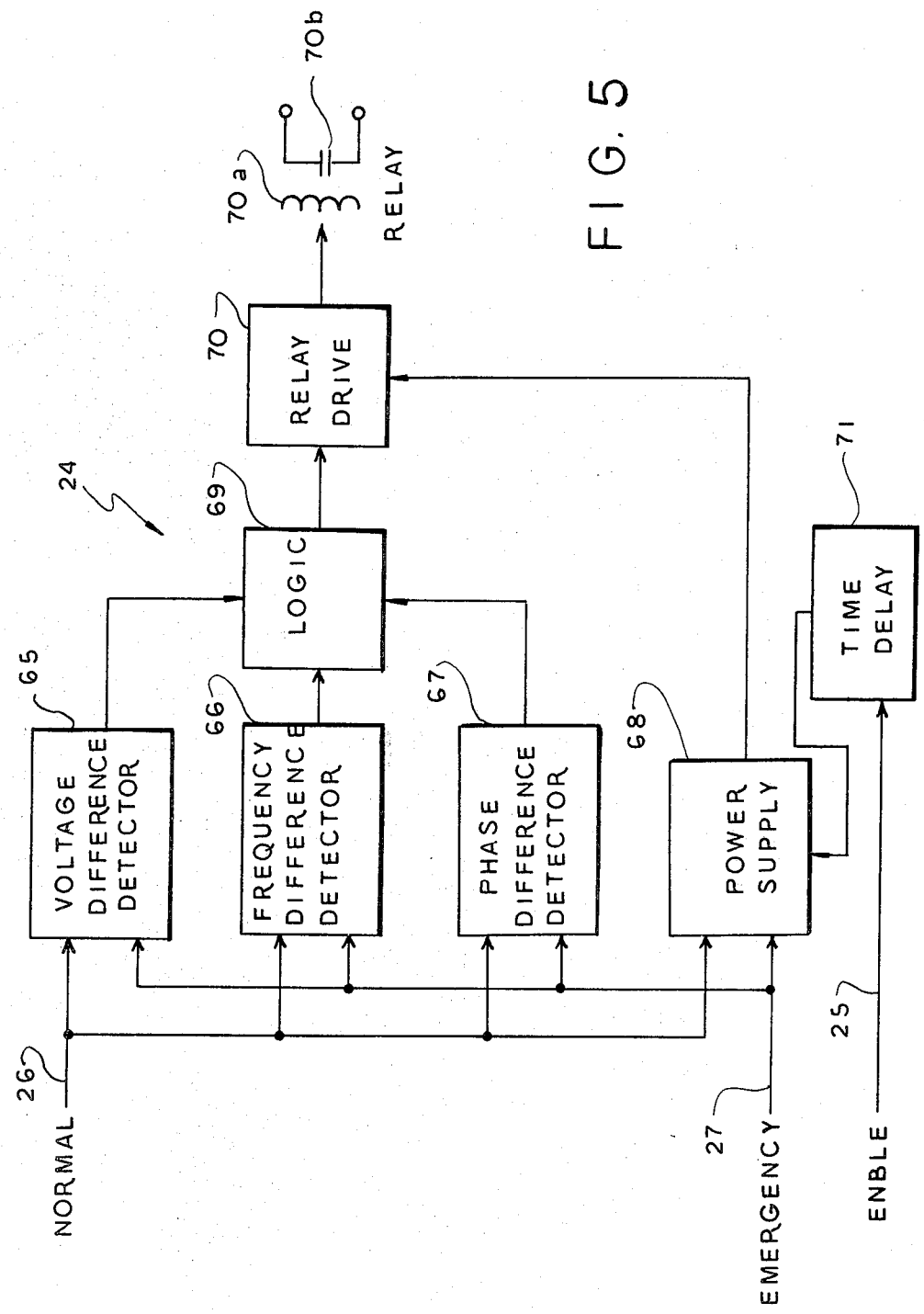
FIG. 5 is a block diagram illustrating a voltage, frequency, and phase monitor according to the present invention.

An illustrative voltage, frequency, and phase difference monitor 24, indicated in FIGS. 1–3, is shown in FIG. 5. The monitor has an enable input 25, a normal source sampling input 26, and an emergency source sampling input 27. The monitor includes a voltage difference detector 65, a frequency difference detector 66, and a phase difference detector 67 each of which continuously receives voltage from sampling inputs 26 and 27, as long as the power sources providing the sampling voltages are operating. These voltages are also applied to a power supply 68 for the monitor relay. Output signals from the detectors are applied to logic circuitry 69 which controls the relay drive 70 of the monitor. The monitor relay is illustrated by a coil 70a and a pair of contacts 70b controlled by the coil. As mentioned above, the monitor also includes a time delay circuit 71 for providing a time delay between the time a voltage is applied to the enable input 25, and the time the power supply is activated. The components of the monitor are shown in more detail in FIGS. 6, 7, 9, 11, and 12.

Figure 6:
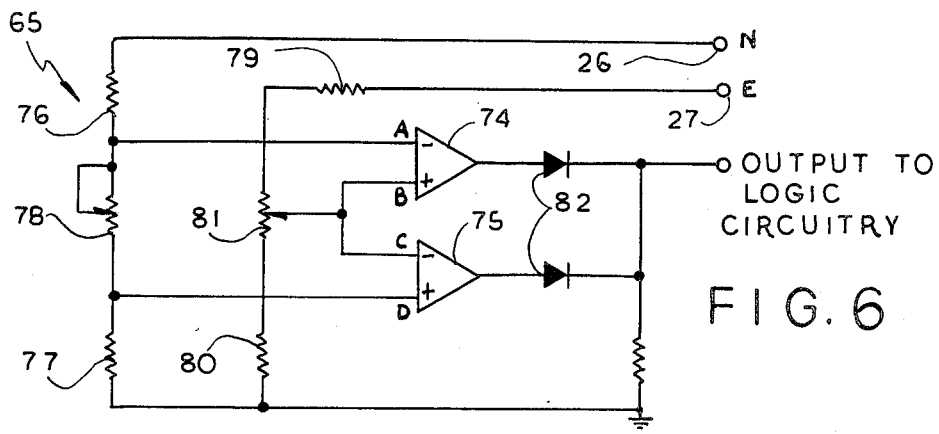
FIG. 6 is a schematic diagram illustrating the voltage difference detector portion of the monitor.

With reference to FIG. 6, a voltage difference detector 65 is shown incorporating two operational amplifiers 74 and 75. The normal source and emergency source voltages are transformed down, rectified, and filtered by conventional means, not shown, resulting in a DC voltage at terminal 26 proportional to the normal source voltage, and a DC voltage at terminal 27 proportional to the emergency source voltage. For the sake of illustration, it is assumed that at rated voltage of the sources, the DC voltage at each terminal 26 and 27 is ten volts. Resistors 76 and 77, and potentiometer 78 constitute a voltage divider for the normal source DC voltage, and resistors 79 and 80, and potentiometer 81 constitute a voltage divider for the emergency source DC voltage. Potentiometer 81 is used to set the center point of the emergency source voltage divider and is, in this example, set at 5.0 volts. Potentiometer 78 is adjusted to set a voltage spread, or "window", and in this example is set so that the voltages sensed by the amplifiers 74 and 75 are 5.5 volts and 4.5 volts, respectively. Diodes 82 are used to decouple the outputs of the two amplifiers from each other.

As long as the voltage at input A of amplifier 74 exceeds that at input B, the output of the amplifier is zero. Similarly, as long as the voltage at input C of amplifier 75 exceeds that at input D, there is zero output from the amplifier. If the emergency source DC voltage drops because of a voltage dip from the generator, causing the voltage at input D to exceed that at input C, the output of amplifier 75 goes positive resulting in a signal indicating an excessive voltage difference between the sources. Conversely, if the emergency source DC voltage rises, because of a generator overshoot, causing the voltage at input B of amplifier 74 to exceed that at input A, the output of amplifier 74 goes positive also resulting in a signal indicating an excessive voltage difference between the sources. Should the emergency source DC voltage remain constant, but the normal source DC voltage rise and fall due to increases and decreases in the normal source voltage, signals are produced by the amplifiers, as described above, indicating an excessive voltage difference between the sources. In effect, amplifiers 74 and 75 measure the voltage difference between the DC voltages which are proportional to the actual normal and emergency AC voltages, and produce a signal whenever one or the other input voltage goes beyond its permissible upper or lower limit.

Figure 7:
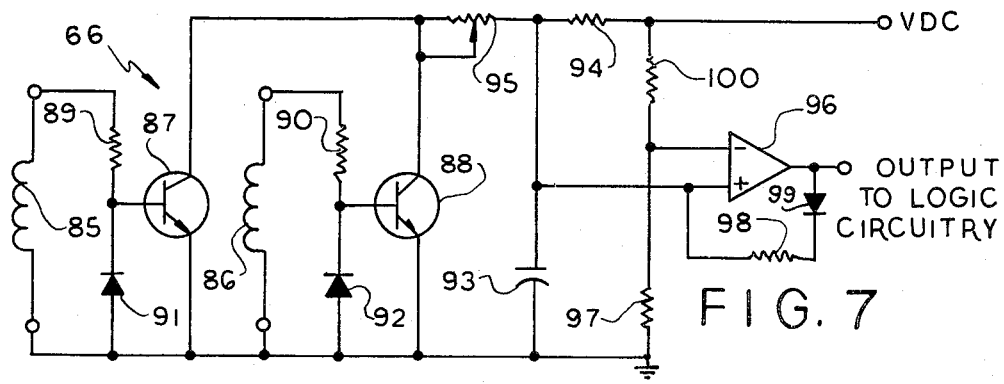
FIG. 7 is a schematic diagram illustrating the frequency difference detector portion of the monitor.

The frequency difference detector 66 shown in FIG. 7 includes transformer secondary windings 84 and 86 driven by the normal source and emergency source, respectively. Windings 85 and 86 in turn drive transistors 87 and 88, respectively, through resistors 89 and 90, respectively, the latter being used for base drive current limiting. Transistors 87 and 88 serve as square wave clamping elements, each output square wave being an in phase replica of the incoming sinusoidal AC voltage. Diodes 91 and 92 prevent the base-to-emitter voltages of transistors 87 and 88, respectively, from going excessively negative.

The waveforms shown in FIGS. 8A, 8B, and 8C help to explain the operation of the circuitry of FIG. 7. Each transistor 87 and 88 generates a square wave 87a and 88a, respectively with a 50% duty cycle. Should the normal and emergency input voltages be offset from each other by 90 electrical degrees, the corresponding square waves generated will be out of harmony by the same amount, as shown in FIG. 8A. The time during which the two square waves are in phase is indicated by the waveform R, and in the example shown in FIG. 8A this time is 4.15 milliseconds. When both sources are in phase, as shown in FIG. 8B, the waveform R' is approximately 8.333 milliseconds wide, which is the maximum time available with this type of gate circuit when operating at 60 Hz.

Referring again to FIG. 7, a capacitor 93 is charged through resistor 94, and discharged through potentiometer 95 by transistors 87 and 88. FIG. 8C shows the voltage across capacitor 93 by means of solid line 93' and broken line 96' shows a reference voltage applied to the minus input of an amplifier 96. The reference voltage is derived from the voltage divider comprising resistors 97 and 100. With a large frequency difference between the normal and emergency sources, the maximum voltage buildup across capacitor 93 will be, as shown in FIG. 8C, below the broken line. As the frequency difference between the two sources decreases, the voltage across capacitor 93, which is the average of the constant charging of the capacitor and its varying discharge times, will increase. Once the voltage 93' across the capacitor goes above the reference voltage 96', even for an instant, the voltage on the positive input to amplifier 96 goes above the reference voltage applied to the negative input of the amplifier causing the output of the amplifier to go positive. When this happens, current flows through diode 99 and resistor 98 causing a large charging current to be applied to capacitor 93. This in turn causes amplifier 96 to latch on continuously signifying that the frequency difference between the two sources is within prescribed limits. Potentiometer 95 is employed to adjust that prescribed frequency difference.

FIG. 9 illustrates a phase difference detector 67, the operation of which is similar to that of the frequency difference detector shown in FIG. 7. Therefore, components similar to those of FIG. 7 have been given the same reference numerals as in FIG. 7, followed by a prime. FIG. 8B indicates that with the normal and emergency sources in phase, the time available to charge capacitor 93 can be no greater than 8.333 milliseconds. In the phase difference detector of FIG. 9, adjustment of potentiometer 102 sets the RC time constant of potentiometer 102 and capacitor 103, so that when both power sources are in phase, yielding the maximum charge time for the capacitor of 8.333 milliseconds, the voltage across 103 rises to above the value dictated by a voltage divider comprising resistors 104 and 105. When this happens, the voltage at the positive input to amplifier 106 exceeds the voltage at its negative input, resulting in an output pulse from the amplifier.

FIG. 10A shows a waveform R, similar to FIG. 8A, when the two power sources are 90° out of phase. The broken line 103' indicates the charge on capacitor 103 during the periods that the sinusoidal waveforms of the two sources have the same sign. In FIG. 10A, the charging time of the capacitor is insufficient to bring the voltage across it above the reference voltage 104' established by resistors 104 and 105. Hence, there is no output pulse from amplifier 106, as indicated by the horizontal line 106' representing the output voltage of the amplifier. FIG. 10B shows the waveform R' when the normal and emergency sources are in phase. In this case, the charging time on capacitor 103 is sufficient to bring the voltage 103' across the capacitor above the reference voltage 104' established by resistors 104 and 105. For the time that the charge across the capacitor exceeds the reference voltage, i.e., the voltage at the positive input of amplifier 106 exceeds the voltage at the negative input, a pulse is present at the amplifier output 106'. The duration of this pulse can be used to determine the degree of synchronism between the two power sources in advance of absolute synchronism.

Potentiometer 102 can be adjusted so that the output pulse from amplifier 106 appears when the phase difference between the two sources is ±5.0 electrical degrees, or any other desired difference, this difference representing a window. In FIG. 10c, the normal voltage source and emergency voltage source are represented by arrows N and E, both rotating about point X at speeds representing the frequency of their respective sources. The broken lines on either side of normal source arrow N delimit the window. The leading edge of the pulse corresponds to the leading edge of the window, and is the point in time that the relay 70 (FIG 5) of the monitor must close to initiate a paralleling of the power sources and transfer of the load. By energizing the monitor relay when the two sources are slightly out of phase and moving toward synchronism, they will be substantially synchronized by the time they are actually paralleled.

FIG. 11 illustrates logic circuitry 69 for assembling the information produced by the three detectors 65, 66, and 67, and for energizing a silicon controlled rectifier 109 to in turn energize relay 70 and actuate the monitor contacts 24a etc. In order for SCR 109 to fire, transistor 110 must turn on. Transistor 110 is controlled by transistors 111, 112, and 113 which must all be turned on in order for SCR 109 to conduct.

As described above, whenever an excessive voltage difference exists between the two sources, e.g., ±5%, a positive output is produced by the voltage difference detector 65. This positive output is applied to terminal 114 of the logic circuitry, and hence is applied to transistor 115 which clamps the base-to-emitter junction of transistor 113. Transistor 113 is normally energized by current flow through resistor 116. However, when a positive voltage is applied to terminal 114 causing transistor 115 to turn on, transistor 113 turns off. Therefore, no positive voltage applied to terminal 114 signifies an acceptable voltage difference between the power sources.

On the other hand, as described above, a positive output from frequency difference detector 66 signifies an acceptable frequency difference between the power sources. This positive output is applied to terminal 117 of logic circuitry 69 cuasing transistor 112 to turn on. Similarly, a positive output from phase difference detector 67 signifies an acceptable phase difference, say ±5 electrical degrees, between the power sources. This positive output applied to terminal 118 of logic circuitry 69 turns on transistor 111. Transistors 111, 112, and 113 comprise an AND circuit, whereby all three must be turned on to energize transistor 110 and hence SCR 109. When the latter is energized, monitor relay 70 is energized to initiate paralleling of the power sources and a transfer of the load.

In FIG. 11, diodes 119 and 120 decouple the signals applied to terminals 117 and 118, respectively, so that the output of each of the detectors 66 and 67 does not feed back into the other. The diodes also prevent excessive reverse base-to-emitter voltages from being applied to transistors 111 and 112. Resistors 116 and 121 are current limiting resistors. Resistors 122 are base-to-emitter stabilizing resistors. Capacitor 123 desensitizes SCR 109 to transient voltages that may cause false firing.

FIG. 12 shows a conventional time delay circuit. Transformer 126 provides circuit isolation between the enable input 25 and the normal and emergency source inputs; the transformer also steps down the enable input voltage to an acceptable level. Diodes 127 full wave rectify the secondary voltage of transformer 126, charging capacitor 128 through diode 129. The DC voltage generated across capacitor 128 is applied to capacitor 130 through resistor 131. As capacitor 130 charges, voltage is reached which fires uninjunction transistor 132 causing capacitor 130 to discharge through resistor 133 and turn on SCR 134. When SCR 134 turns on, it connects relay coil 135 to the full wave rectified voltage seen at the output of diodes 127. Relay 135 is energized, causing contacts 136 within the monitor 24 to close and energize the monitor circuitry. The duration of the time delay is determined by the values of resistor 131, capacitor 130, and the firing point of unijunction transistor 132. The values of resistor 131 and capacitor 130 are preferably chosen to provide a delay of from 1.5 to 2.0 seconds.

Resistor 137 proivdes latching current for SCR 134 when the SCR is energized. Diode 129 prevents excessive voltage from being applied to the coil of relay 135. Resistor 133 is a gate stabilizing resistor for SCR 134 and also a current path for capacitor 130 when the latter discharges. Capacitor 138 desensitizes SCR 134 so that it does not fire indiscriminately in the presence of unwanted transient voltages. Diode 139 isolates the full wave rectified voltage seen at the anode of SCR 134 (before the delay has expired) from the timing circuitry connected across capacitor 128.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A system for transferring a load from a first AC power source to a second AC power source without interrupting power supply to the load, comprising:
   (a) a monitor for sensing both power sources and producing an output signal when the differences between certain characteristics of the two sources are within prescribed limits,
   (b) contact means which when closed and open connect and disconnect, respectively, the first AC power source to the load,
   (c) contact means which when closed and open connect and disconnect, respectively, the second AC power source to the load, one of said contact means being open and the other closed during steady state operation of the system,
   (d) additional contact means connected in parallel with one of said contact means (b) and (c), the additional contact means, when closed, connecting one of the power sources to the load,
   (e) means responsive to an output signal from the monitor for closing the additional contact means, and
   (f) means responsive to closing of the previously open contact means (b) and (c) and to opening of the previously closed contact means (b) and (c) for opening the additional contact means.

2. A system as defined in claim 1 including means for sensing certain characteristics of the second power source and for initiating operation of the monitor (a) only after the sensed characteristics reach predetermined levels.

3. A system as defined in claim 1 including means for activating and deactivating the second power source as desired, and means for maintaining the second power source activated so long as the load remains connected to the second power source.

4. A system as defined in claim 1 including time delay means for delaying operation of the monitor (a) prior to transfer of the load from the second power source to the first power source.

5. A system as defined in claim 1 including means responsive to the failure of either power source to which the load is connected for automatically operating means (b) and (c) to disconnect the load from the failed source and connect the load to the alternative source.

6. A system as defined in claim 1 wherein the contact means (b) and means (c) include an automatic transfer switch.

7. A system as defined in claim 6 wherein the additional contact means (d) includes contacts connected in parallel with the contacts on one side of the automatic transfer switch.

8. A system as defined in claim 1 wherein means (b) and (c) include an automatic transfer switch having first and second sets of contacts for alternatively connecting the load to the first and second power sources, and a set of additional contacts connected in parallel with each set of transfer switch contacts.

9. A system as defined in claim 8 including means controlled by the position of each set of parallel-connected contacts for preventing operation of the transfer switch in the event that a set of additional contacts cannot open.

10. A system as defined in claim 1 including an alarm, and means for operating the alarm, after a predetermined time delay, should the monitor not produce an output signal which operates responsive means (e).

11. A system as defined in claim 1 wherein the monitor (a) includes a voltage difference detector, a frequency difference detector, and a phase difference detector for comparing the voltages, frequencies, and phases of the two power sources.

12. A system as defined in claim 1 wherein the voltage difference detector includes means for applying to that detector signals proportional to the voltages of the two power sources, adjustable means for prescribing an acceptable difference in voltage between the two power sources, and means for indicating when the voltages of the two sources are within the prescribed differential.

13. A system as defined in claim 11 wherein the frequency difference detector includes means for applying to that detector signals representative of the frequencies of the two power sources, adjustable means for prescribing an acceptable difference in frequency between the two power sources, and means for indicating when the frequencies of the two sources are within the prescribed differential.

14. A system as defined in claim 11 wherein the phase difference detector includes means for applying to that detector signals representative of the phase of the two power sources, adjustable means for prescribing an acceptable difference in phase between the two power sources, and means for indicating when the phase difference between the two sources is within the prescribed differential.

15. A system as defined in claim 11 wherein the monitor (a) includes a relay, and means responsive to the three detectors for energizing the relay only when the detectors indicate that the voltages, frequencies, and phases of the two power sources are within prescribed differential limits.

* * * * *